Patented Jan. 15, 1952

2,582,375

UNITED STATES PATENT OFFICE 2,582,375

INSECT CONTROL WITH AN HYDROGENATED NAPHTHYLAMINE

Robert D. Englert, Henry J. Gerjovich, and Michel Pijoan, Boulder, Colo., assignors to The Chemical Foundation, Inc., New York, N. Y., a corporation of New York No Drawing. Application February 28, 1947, Serial No. 731,704

6 Claims. (Cl. 167—32)

This invention relates to an improved method of controlling insects.

It has been previously shown in application, Serial No. 673,035, filed May 29, 1946, now Patent No. 2,578,736, that certain naphthalene derivatives, especially those resulting from chloral condensations of naphthalene derivatives exhibit marked insecticidal action. In the course of investigation of the efficacy of these compounds, as insecticides, it has been further ascertained that certain of the intermediate compounds, in themselves, present very marked insecticidal properties. It has been determined, for example, that hydrogenated naphthylamines such as 5,-amino, 1,2,3,4, tetrahydro napthalene, 2,amino, 1,2,3,4, tetrahydro naphthalene, and decahydro alpha napthylamine, which for the sake of a term can be designated amino substituted hydrogenated naphthylenes, present marked insecticidal action. We have also found that this type of insecticidal property is exhibited by the products obtained by a Schiff-base condensation reaction of hydrogenated naphthylamine and chloral, that is to say a reaction product in which the chloral group is linked directly with the amino, yielding 1, trichloroethane tetrahydronaphthylamine.

The efficacy of these types of compounds is evidenced by their action against such typical insects as flies and roaches as is indicated by the data in the table below. In the tests from which this data was derived the test insects were contacted with 0.01 ml. of a 10% solution of the indicated compound and the killing time was observed.

Table

[0.01 ml. contact of 10% solution of compounds in kerosene.]

| Compound | Killing time in minutes | |
|---|---|---|
| | Houseflies [1] | Roaches [2] |
| 5, amino 1, 2, 3, 4, tetrahydronaphthalene. | 1 to 10 | 10 to 20. |
| 2, amino 1, 2, 3, 4, tetrahydronaphthalene. | 1 to 10 | 10 to 20. |
| decahydronaphthylamine | 1 to 10 | 10 to 20. |
| 1, trichloroethane tetrahydronaphthylamine. | 1 to 10 | 10 to 20. |

[1] *Musca domestica*.
[2] *Periplaneta americana*.

The residual effectiveness of these compounds is from 50 to 80 hours. By this is meant that insects brought into contact with surfaces coated with a 10% solution of the compound, applied 50 to 80 hours previously, were killed.

The compounds 2,amino, 1,2,3,4, tetrahydronaphthalene, 5,amino, 1,2,3,4, tetrahydronaphthalene were prepared as follows:

1 mol of either alpha or beta naphthylamine was dissolved in absolute ethyl alcohol in the presence of 20 gms. of activated Raney nickel and was then hydrogenated at 150 atmospheres of hydrogen at a temperature of 150° C. until theoretical absorption of hydrogen occurred. The bomb was then cooled, the alcohol was removed by distillation and the residue was distilled and two fractions collected. The first fraction, distilling between 105 to 125° C. at 20 mm. pressure consisted of incompletely hydrogenated decahydronaphthylamines derived primarily from the alpha naphthylamine. The second fraction, distilling between 140 to 146° C. under 16 mm. pressure was collected and was found to consist of two compounds, namely, 2,amino, 1,2,3,4, tetrahydronaphthalene (refractive index 1.5750 at 27° C.) and 5,amino, 1,2,3,4, tetrahydronaphthalene (refractive index 1.5829 at 27° C.).

The substantially pure decahydronaphthylamine was obtained by the hydrogenation of alpha naphthylamine under the stated conditions:

The compound 1,trichloroethane tetrahydronaphthylamine was prepared as follows:

10 gms. of dehydrated chloral were dissolved in 50 ml. of petroleum ether and this was added to a solution of 10 gms. of beta, 1,2,3,4, tetrahydronaphthylamine in 50 ml. of anhydrous ethyl ether. The vigorous reaction was allowed to continue for approximately 30 minutes during which the ether was evaporated. The residue was distilled and the fraction distilling over at 192 to 196° C. under 12 mm. pressure was collected.

While in the previous application referred to it was shown that chloral condensation products of naphthalene or naphthol derivatives possessed insecticidal properties it is now found that in the case of naphthylamine such chloral condensation is not necessary to impart this desired insecticidal property. As disclosed herein, it is possible, by the simple expedient of hydrogenating naphthylamines to obtain products with insecticidal properties substantially equal to those produced by chloral condensation. Thus, it is seen certain hydrogenated naphthylamines serve as excellent contact insecticides possessing marked lethal action.

While certain preferred insecticidal compounds have been described it is to be understood that these are given to illustrate the novel concept of utilizing hydrogenated naphthylamines as effective contact insecticides.

We claim:

1. An improved method of controlling insects which comprises contacting the insects with an insecticide composition comprising as an effective ingredient hydrogenated naphthylamine dissolved in kerosene.
2. An improved method of controlling insects which comprises contacting the insects with an insecticide comprising as an effective ingredient 5,amino, 1,2,3,4 tetrahydronaphthalene dissolved in kerosene.
3. An improved method of controlling insects which comprises contacting the insects with an insecticide comprising a 10% solution of 5,amino, 1,2,3,4, tetrahydronaphthalene in kerosene.
4. A method of controlling insects which comprises contacting the insects with an insecticide comprising a 10% solution of 2,amino, 1,2,3,4, tetrahydronaphthalene in kerosene.
5. A method of controlling insects which comprises contacting the insects with a 10% solution of 1,trichloroethane tetrahydronaphthylamine in kerosene.
6. A method of controlling insects which comprises contacting the insects with an insecticide comprising as an effective ingredient a 10% solution of a hydrogenated naphthylamine in kerosene.

ROBERT D. ENGLERT.
HENRY J. GERJOVICH.
MICHEL PIJOAN.

REFERENCES CITED

The following references are of record in the file of this patent:

FOREIGN PATENTS

| Number | Country | Date |
|---|---|---|
| 506,928 | Great Britain | June 6, 1939 |
| 290,175 | Great Britain | Aug. 7, 1929 |
| 302,003 | Germany | Nov. 24, 1917 |
| 324,757 | Germany | Sept. 3, 1920 |

OTHER REFERENCES

Hackh's Chem. Dict., 3rd. ed., 1944, p. 840, article "Tetrahydronaphthylamine, alpha." Copy in Div. 43.

Fink et al.: U. S. D. A. Bur. of Ent. & Plant Quar. Mimeo Pub. E-425 entitled, "Toxicity Tests with Synthetic Organic Compounds Against Culcine Mosquito Larvae," March, 1938, pp. 1-4, 15. 167-22.

McAllister et al.: J. Econ. Ent., vol. 23 No. 6, Dec. 1930, pp. 907-913, 919. (Comp. No. 28.) (Copy in Div. 43.)

Allers et al.: Chem. Abst., vol. 24, p. 5862 (1930). (Copy in Pat. Off. Lib.)